(12) United States Patent
Sengupta et al.

(10) Patent No.: US 7,378,939 B2
(45) Date of Patent: May 27, 2008

(54) METHOD AND APPARATUS FOR PROVIDING PROXIMITY BASED AUTHENTICATION, SECURITY, AND NOTIFICATION IN A WIRELESS SYSTEM

(76) Inventors: Uttam K. Sengupta, 14192 NW. Meadowridge Dr., Portland, OR (US) 97229; Nikhil M. Deshpande, 16311 SW. Horseshoe Way, Beaverton, OR (US) 97007

(*) Notice: Subject to any disclaimer, the term of this patent is extended or adjusted under 35 U.S.C. 154(b) by 405 days.

(21) Appl. No.: 10/813,178

(22) Filed: Mar. 30, 2004

(65) Prior Publication Data

US 2005/0221798 A1 Oct. 6, 2005

(51) Int. Cl.
*H04L 9/00* (2006.01)

(52) U.S. Cl. .................. 340/5.64; 340/5.53; 340/5.83; 340/7.6; 455/26.1; 455/411

(58) Field of Classification Search .............. 340/5.64, 340/5.81, 5.82, 5.84, 5.53, 5.83, 7.6, 407.1; 455/26.1, 411, 456.1; 344/26.1
See application file for complete search history.

(56) References Cited

U.S. PATENT DOCUMENTS

| | | | |
|---|---|---|---|
| 5,821,854 A * | 10/1998 | Dorinski et al. ............ 340/5.74 |
| 6,137,480 A * | 10/2000 | Shintani ...................... 340/5.6 |
| 6,189,105 B1 * | 2/2001 | Lopes .......................... 726/20 |
| 6,256,737 B1 * | 7/2001 | Bianco et al. ............. 713/186 |
| 6,307,471 B1 * | 10/2001 | Xydis ....................... 340/568.1 |
| 6,344,795 B1 * | 2/2002 | Gehlot ........................ 340/540 |
| 6,424,251 B1 * | 7/2002 | Byrne ........................ 340/7.58 |
| 6,483,929 B1 * | 11/2002 | Murakami et al. .......... 382/115 |
| 6,850,147 B2 * | 2/2005 | Prokoski et al. ........... 340/5.82 |
| 7,111,174 B2 * | 9/2006 | Hamid ....................... 713/186 |
| 2001/0049471 A1 * | 12/2001 | Suzuki et al. ............... 600/300 |
| 2002/0190125 A1 * | 12/2002 | Stockhammer ............. 235/382 |
| 2003/0023882 A1 * | 1/2003 | Udom ........................ 713/202 |
| 2003/0025603 A1 * | 2/2003 | Smith ........................ 340/5.64 |
| 2003/0043078 A1 * | 3/2003 | Deng et al. .......... 343/700 MS |
| 2003/0046228 A1 * | 3/2003 | Berney ....................... 705/41 |
| 2003/0147651 A1 * | 8/2003 | Roes et al. ................. 398/108 |
| 2003/0220765 A1 * | 11/2003 | Overy et al. ................ 702/158 |
| 2004/0046638 A1 * | 3/2004 | Kawasaki ................... 340/5.61 |
| 2004/0176107 A1 * | 9/2004 | Chadha .................... 455/456.5 |
| 2004/0257196 A1 * | 12/2004 | Kotzin ....................... 340/5.52 |
| 2004/0257202 A1 * | 12/2004 | Coughlin et al. .......... 340/5.82 |
| 2005/0114654 A1 * | 5/2005 | Brackett et al. ............ 713/161 |
| 2005/0130600 A1 * | 6/2005 | Gordon .................... 455/67.15 |
| 2005/0162258 A1 * | 7/2005 | King ........................ 340/407.1 |

* cited by examiner

*Primary Examiner*—Edwin C. Holloway, III

(57) ABSTRACT

Techniques and structures are disclosed for providing proximity based authentication, security, and/or user notification in a wireless system.

25 Claims, 5 Drawing Sheets

METHOD AND APPARATUS FOR PROVIDING PROXIMITY BASED AUTHENTICATION, SECURITY, AND NOTIFICATION IN A WIRELESS SYSTEM

TECHNICAL FIELD

The invention relates generally to wireless communications and, more particularly, to authentication and notification techniques for use in wireless systems.

DETAILED DESCRIPTION

Figure 1:
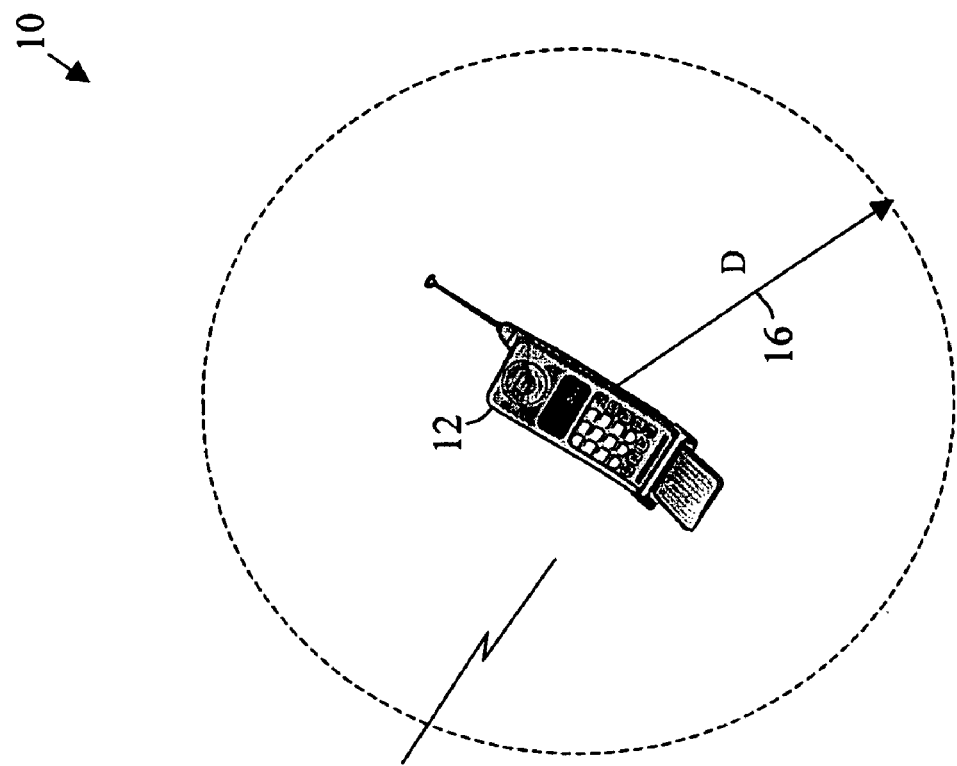
FIG. 1 is a schematic diagram illustrating an example wireless personal area network in accordance with an embodiment of the present invention.
Figure 1:
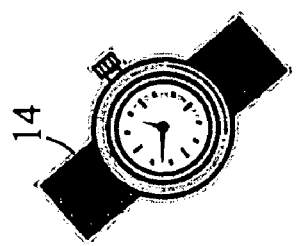

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a schematic diagram illustrating an example wireless personal area network 10 in accordance with an embodiment of the present invention. As shown, the personal area network 10 includes a wireless device 12 (a cellular telephone in the illustrated embodiment) that is communicating with a wireless body appliance 14 (a watch in the illustrated embodiment). The wireless body appliance 14 is a device that is intended to be worn by a user and that includes wireless communication capabilities that allow it to communicate with other wireless structures. The wireless body appliance 14 may also include biometric authentication functionality that allows it to authenticate a user that is currently wearing the appliance 14. The wireless body appliance 14 may include any type of structure that may be worn by a user. In at least one embodiment, the wireless body appliance 14 is an article of jewelry (e.g., a ring, a locket, a brooch, a bracelet, a necklace, a watch, etc.), although other wearable structures are also possible (e.g., a glove, a hat, a wearable telephone, etc.). The wireless device 12 may include any device or structure that is capable of communicating wirelessly with other wireless devices or systems including, for example, a cellular telephone or other handheld wireless communicator, a laptop, palmtop, desktop, or tablet computer having wireless networking capability, a personal digital assistant (PDA) having wireless networking capability, a pager, and/or others. In at least one embodiment of the present invention, the wireless device 12 may grant access to a user based on factors such as, whether or not the user has been authenticated by the wireless body appliance 14, whether or not the wireless body appliance 14 is within a predetermined distance D of the wireless device 12, and/or other factors.

Figure 2:
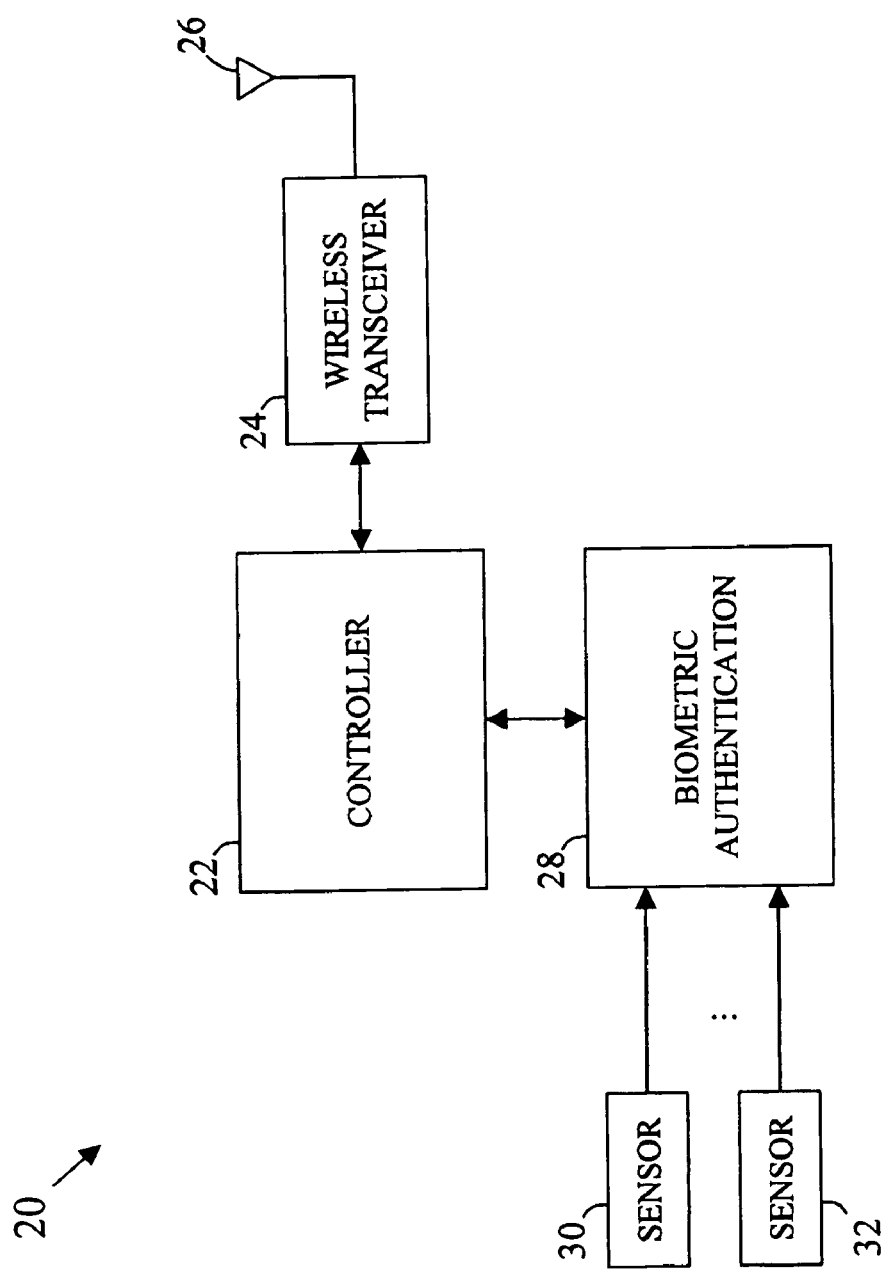
FIG. 2 is a block diagram illustrating an example wireless body appliance in accordance with an embodiment of the present invention.

FIG. 2 is a block diagram illustrating an example wireless body appliance 20 in accordance with an embodiment of the present invention. The wireless body appliance 20 may be used, for example, within the personal area network 10 of FIG. 1 and/or within other networks and systems. As illustrated, the wireless body appliance 20 may include one or more of: a controller 22, a wireless transceiver 24, an antenna 26, a biometric authentication unit 28, and one or more biometric sensors 30, 32. The controller 22 is operative for controlling the overall operation of the wireless body appliance 20. The controller functionality may be implemented within, for example, one or more digital processing devices within the appliance 20 (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above).

The wireless transceiver 24 is operative for supporting wireless communication with a wireless device in a vicinity of the wireless body appliance 20. In at least one embodiment of the invention, the wireless transceiver 24 may be adapted for short range, low power wireless communication. The wireless transceiver 24 may be configured in accordance with one or more wireless standards including, for example, one or more wireless cellular standards, one or more wireless networking standards, one or more radio frequency identification (RFID) standards, and/or others. In at least one implementation, for example, the wireless transceiver 24 is configured in accordance with the Bluetooth short range wireless protocol (Specification of the Bluetooth System, Version 1.2, Bluetooth SIG, Inc., November 2003, and related specifications and protocols). Other possible wireless networking standards include, for example: IEEE 802.11 (ANSI/IEEE Std 802.11-1999 Edition and related standards), HIPERLAN 1, 2 and related standards developed by the European Telecommunications Standards Institute (ETSI) Broadband Radio Access Networks (BRAN), HomeRF (HomeRF Specification, Revision 2.01, The HomeRF Technical Committee, July, 2002 and related specifications), Ultrawideband, and/or others. Special protocols may also (or alternatively) be developed to support the link between the wireless body appliance 20 and a wireless device. The wireless transceiver 24 may be coupled to one or more antennas 26 to facilitate the transmission and reception of wireless signals. Any type of antenna(s) may be used including, for example, a dipole antenna, a patch antenna, a helical antenna, an antenna array, and/or others, including combinations of the above.

The biometric sensors 30, 32 are sensors that are capable of collecting biometric information from a user that is currently wearing the wireless body appliance 20. As used herein, the term "biometric" relates to methods and structures for recognizing a person based on physiological and/or behavioral characteristics. The biometric sensors 30, 32 are capable of measuring such characteristics. The biometric sensors 30,32 may include, for example, a fingerprint sensor, a skin temperature sensor, a skin texture sensor, a hand geometry sensor, a body chemistry sensor (e.g., saliva composition, etc.), a heartbeat sensor, a retinal scanner, a microphone to detect audio cues, a camera or other structure to detect visual cues, and/or others.

The biometric authentication unit 28 is operative for determining whether a person currently wearing the wireless body appliance 20 is an authorized user, based on collected biometric information. The biometric authentication unit 28 may perform this function by, for example, comparing the collected biometric information (or a derivative thereof) to stored information associated with the authorized user (or users if more than one user is authorized). For example, collected fingerprint information may be compared to stored fingerprint information for each authorized user, etc. The biometric authentication unit 28 may require a match for a single type of collected information (e.g., fingerprint only) or for multiple different types of collected information (e.g., fingerprint, skin texture, etc) before determining that a person currently wearing the appliance 20 is an authorized user. However, a match may not be required for all available biometric information to make a determination of authenticity. For example, it may only be required that two types of information out of four produce a match to determine that a user is authentic. In at least one embodiment, the biometric authentication unit 28 is implemented within a common digital processing device (or devices) as the controller functionality.

Figure 3:
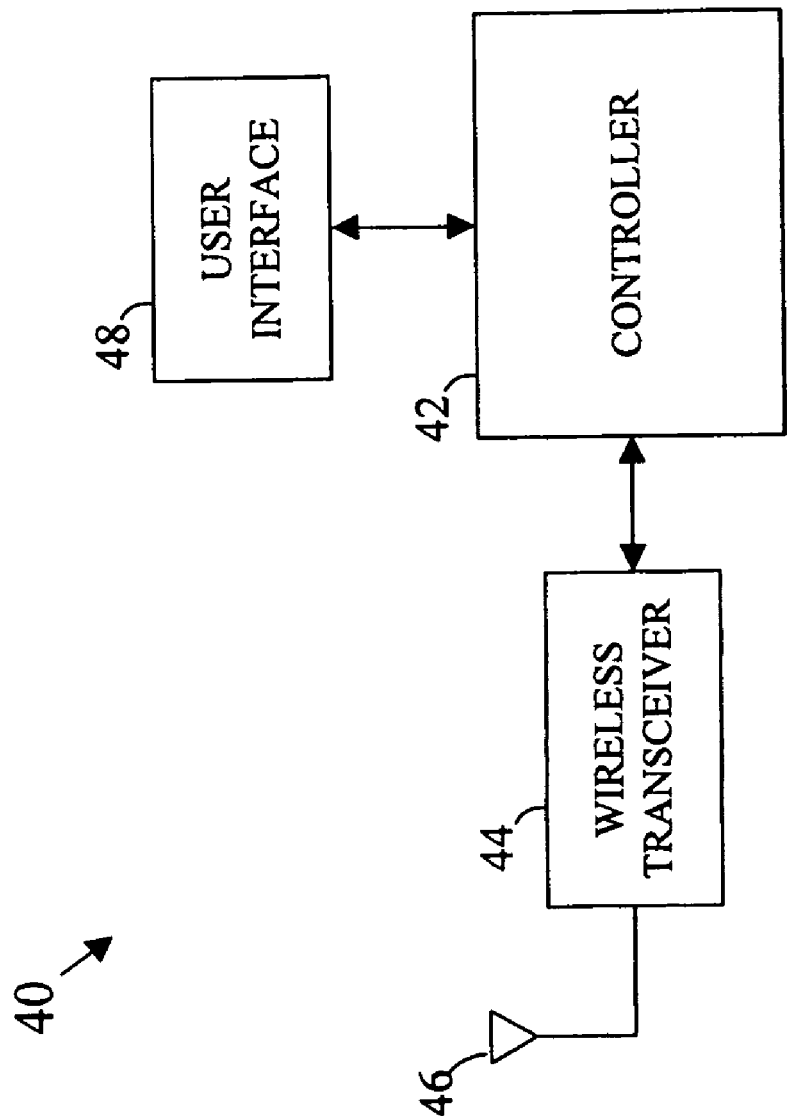
FIG. 3 is a block diagram illustrating an example wireless device in accordance with an embodiment of the present invention.

FIG. 3 is a block diagram illustrating an example wireless device 40 in accordance with an embodiment of the present invention. The wireless device 40 may be used, for example, within the personal area network 10 of FIG. 1 and/or within other networks or systems. As illustrated, the wireless device 40 may include one or more of: a controller 42, a wireless transceiver 44, an antenna 46, and a user interface 48. The controller 42 is operative for controlling the overall operation of the wireless device 40. The controller functionality may be implemented within, for example, one or more digital processing devices within the device 40. The wireless transceiver 44 is operative for supporting wireless communication with a wireless body appliance as well as one or more other wireless entities. For example, if the wireless device 40 is a cellular telephone, the wireless transceiver 44 may be configured to support communication with a remote cellular base station or the like in addition to the wireless body appliance. If the wireless device 40 is a portable computer or a PDA with wireless networking capability, the wireless transceiver 44 may be configured to support wireless communication with a remote network access point in addition to the wireless body appliance. In at least one embodiment, separate transceivers are provided within the wireless device 40 to support wireless communication with the wireless body appliance and with other wireless entities. The wireless transceiver 44 may be coupled to one or more antennas 46 to facilitate the transmission and reception of wireless signals. Any type of antenna(s) may be used including, for example, a dipole antenna, a patch antenna, a helical antenna, an antenna array, and/or others, including combinations of the above.

The user interface 48 is operative for providing an interface between a user and the device 40. The user interface 48 may include structures such as, for example, a keyboard, a liquid crystal display (LCD), a speaker, a microphone, a mouse, a stylus, and/or any other form of device or structure that allows a user to input information or commands to the device 40 or receive information or responses from the device 40. As will be appreciated, the specific types of input/output devices that are used will depend upon the type of wireless device at issue.

In at least one embodiment of the present invention, the controller 42 may be programmed to receive a signal from a wireless body appliance that indicates that a user currently wearing the body appliance has been authenticated (e.g., biometrically authenticated). The controller 42 may then proceed to grant access to the wireless device 40 for the user based thereon. In at least one implementation, the controller 42 may first determine whether the wireless body appliance (and, therefore, the user) is within a predetermined distance of the wireless device 40 before access is granted. If the wireless body appliance is within a predetermined distance of the wireless device 40 and the wireless body appliance indicates that the user has been authenticated, the controller 42 may automatically "log in" the user to the wireless device 40. If the wireless device 40 is locked, the controller 42 may also automatically unlock the wireless device 40 at this time. If the wireless body appliance later goes outside the predetermined distance from the wireless device 40, then the controller 42 may automatically lock the wireless device 40 so that no one may use the device. Thus, if the wireless device 40 is a desktop computer, and the corresponding user temporarily leaves his or her desk to go to lunch, the computer will automatically lock so that no one else can use it in the user's absence. Similarly, if the wireless device 40 is a cellular telephone and is inadvertently left somewhere by the user, or is stolen, the device will automatically lock up and thus be unusable by an unauthorized party in possession thereof. Even though the device is locked, the user may remain logged in so that, when the wireless body appliance again comes within a predetermined distance of the wireless device 40, the device 40 will simply be unlocked without having to repeat the automatic log in procedure. The above description assumes that the user remains authenticated by the wireless body appliance. If the wireless body appliance at some point identifies the user as not being authenticated (e.g., the user takes off the wireless body appliance), then the controller 42 may immediately lock the wireless device 40 to prevent access thereto. The user may also be automatically logged out of the device at this time.

Figure 4:
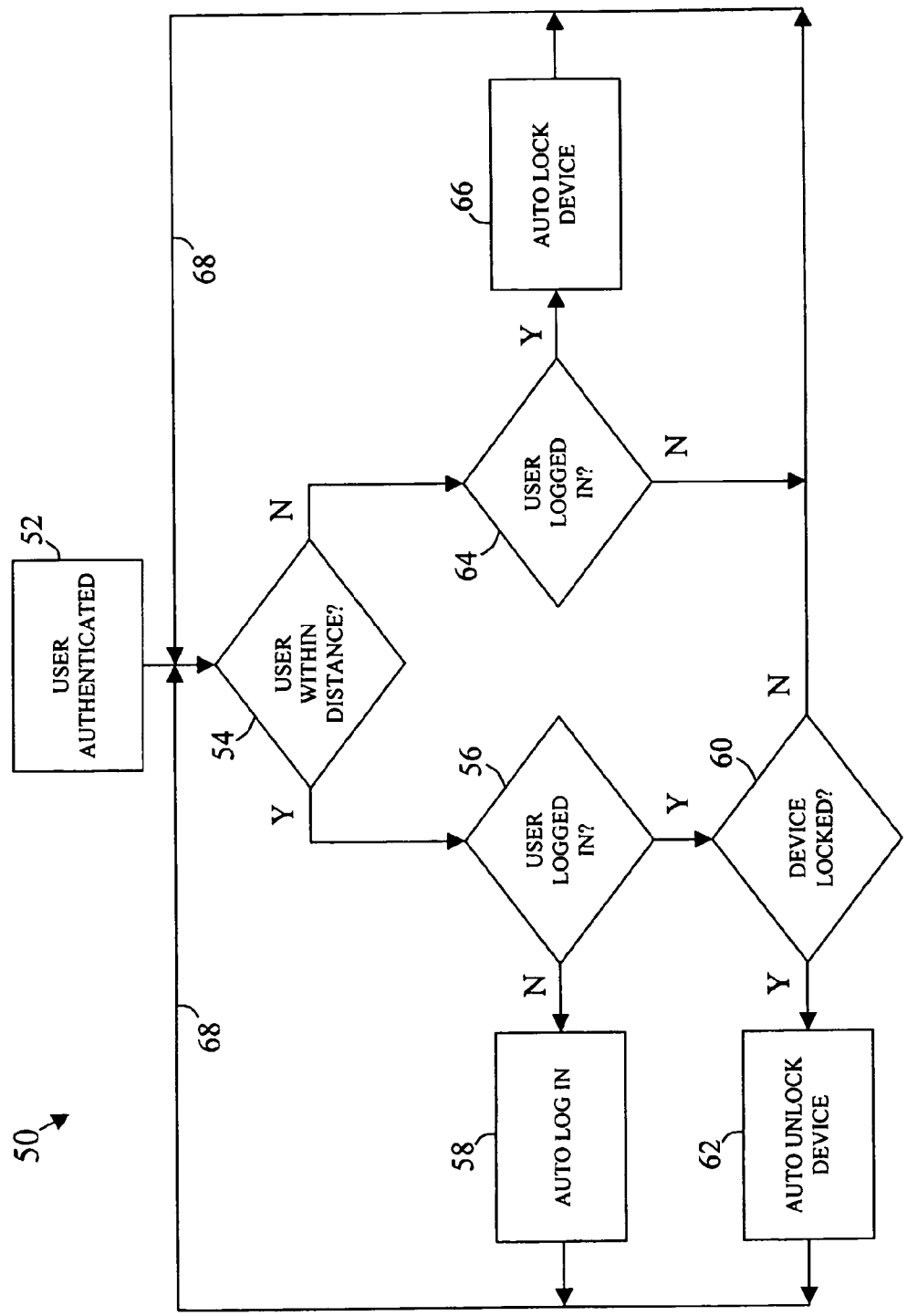
FIG. 4 is a flowchart illustrating an example method for use in operating a wireless device in accordance with an embodiment of the present invention.

FIG. 4 is a flowchart illustrating an example method 50 for use in operating a wireless device in accordance with an embodiment of the present invention. It is first determined that a user has been authenticated by a wireless body appliance being worn by the user (block 52). In at least one embodiment, biometric authentication techniques are used by the wireless body appliance to authenticate the user. It is next determined whether the wireless body appliance (and, therefore, the user) is within a predetermined distance of the wireless device (block 54). Any of a variety of different techniques may be used to determine whether the wireless body appliance is within the predetermined distance. For example, in one possible approach, a power level being received at the wireless device from the wireless body appliance may be measured and, if the power level is below a predetermined threshold, it may be assumed that the wireless body appliance is outside the predetermined distance. In another possible approach, a round trip signal propagation time between the units may be measured to determine the distance. In yet another possible approach, triangulation techniques may be used. In still another possible approach, each of the units may be equipped with a global positioning system (GPS) receiver to determine a location thereof and a difference between the two locations may be calculated. As will be appreciated, other techniques (e.g., techniques based on differential time of arrival, angle of arrival, etc.) and combinations of techniques may alternatively be used to determine the present distance between the units.

If the wireless body appliance is within the predetermined distance of the wireless device, it may then be determined whether the user is currently logged in to the device (block 56). If not, the user may be automatically logged in (block 58). If the user is currently logged in to the device, it may then be determined whether the device is currently locked (block 60). If the device is currently locked, the device may be automatically unlocked at this point (block 62). The user will now be able to use the device in a normal manner. If the wireless body appliance is determined to be outside the predetermined distance, it may then be determined whether the user is currently logged in to the device (block 64). If the user is currently logged in, the device may be automatically locked at this point, preventing access to the device (block 66). If the user is not logged in at this time, than it is not necessary to lock the device (i.e., there will be no access to the device). The method 50 may periodically or continuously recheck whether the wireless body appliance is within the predetermined distance of the user device (arrows 68) and control the wireless device accordingly. For example, if the user is logged in and the device is unlocked, and the wireless body appliance then goes outside the predetermined distance, then the device will automatically lock up. If the device is locked up and the wireless body appliance then comes within the predetermined distance, then the user will be automatically logged in (if not logged in already) and the device will be automatically unlocked, and so on.

Referring back to FIG. 1, in at least one embodiment of the present invention, the wireless device 12 is capable of notifying a user, through a corresponding wireless body appliance 14, that one or more events have occurred. Events may include, for example, a telephone call, an email message, an instant message, and/or a facsimile message being received by the wireless device 12; a telephone call, email message, instant message, and/or facsimile message being received by the wireless device 12 from a particular source, a scheduled task reminder, a scheduled calendar reminder, a change in a calendar, a change in a to do list, a change in a task list, a stock price reaching a specified value, and/or other events. In at least one implementation, the events that will result in notification through the wireless body appliance may be specified by the associated user. When an identified event occurs, the wireless device 12 may send a wireless notification signal to the wireless body appliance 14 to notify the user of the occurrence. When the wireless body appliance 14 receives the notification signal, it may then signal the user in a predetermined manner.

The wireless body appliance 14 may have multiple different ways to notify a user that an event has occurred. For example, the wireless body appliance 14 may have the ability to vibrate, emit an audible signal, be illuminated, experience an increased or decreased temperature, and/or others. In at least one embodiment of the invention, the type of notification that will be made to a user by the wireless body appliance may depend on the current location of the user (and the wireless user device 12). For example, if the user is currently within a movie theatre, the wireless body appliance 14 may vibrate to notify the user of an event. If the user is currently in a company meeting room, the wireless body appliance 14 may glow. If the user is currently riding a bicycle, the wireless body appliance 14 may ring and vibrate. As will be appreciated, many alternative notification schemes may be defined. In one possible approach, a number of different location types and corresponding notification types may be stored within the wireless user device 12. These may be preprogrammed into the user device 12 and/or they may be user specified. When a notification is to be made to a user, the wireless device 12 may first determine its present location. Present location may be determined by, for example, using an on-board global positioning system (GPS) receiver, using triangulation techniques, contacting a remote, network-based mobile location server, and/or by other techniques. It is then determined whether the present location of the wireless device has a predefined notification type specified within the wireless device. For example, it may be determined that the location is within a movie theatre and that vibration is to be used as a notification technique within movie theatres. In one possible approach, a network access point in communication with the wireless user device 12 may inform the device 12 as to the type of location it is presently in (e.g., a movie theatre, etc.). The wireless device 12 may then simply look up the appropriate notification type(s) to be used.

Once one or more types of notification have been identified, a notification signal may be generated within the wireless device 12 that will inform the wireless body appliance as to the type(s) of notification to be used. If there is no notification type identified for the present location of the wireless device, then a default notification technique may be used. In an alternative approach, the wireless device 12 may simply send a generic notification signal to the wireless body appliance 14 and the wireless body appliance 14 may determine a current location and determine an appropriate notification technique based thereon.

Figure 5:
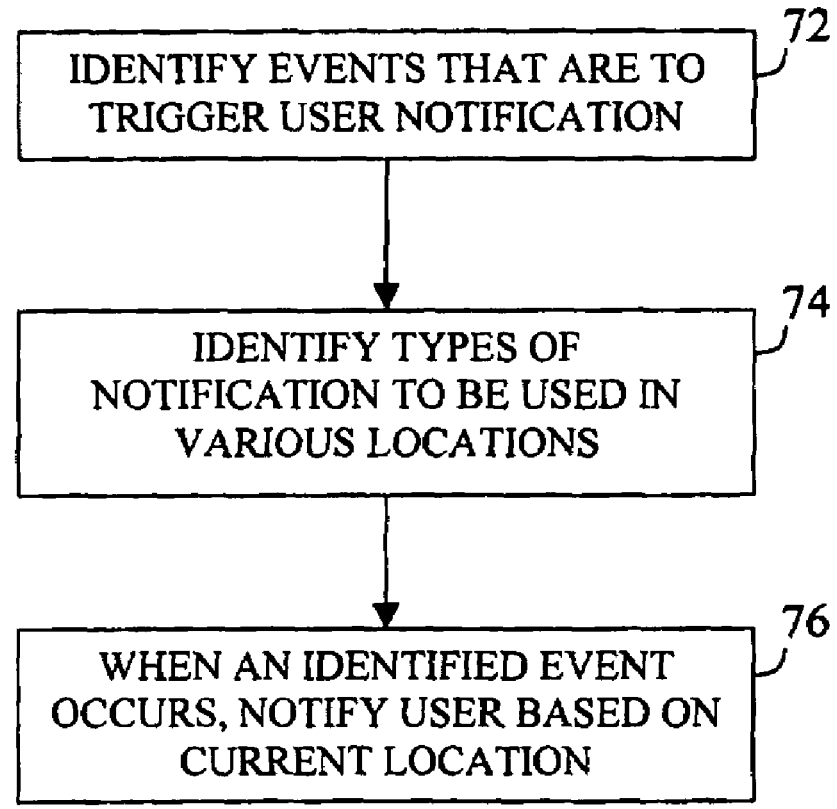
FIG. 5 is a flowchart illustrating an example method for use in notifying a user wearing a wireless body appliance of predetermined events in accordance with an embodiment of the present invention.

FIG. 5 is a flowchart illustrating an example method 70 for use in notifying a user wearing a wireless body appliance of predetermined events in accordance with an embodiment of the present invention. A list of events that are to trigger user notification are identified (block 72). Types of notification to be used within various locations are also identified (block 74). When an identified event occurs, the user is then notified, through the wireless body appliance, in a manner dictated by the present location of the user device or user (block 76).

It should be appreciated that the individual blocks illustrated in the block diagrams herein may be functional in nature and do not necessarily correspond to discrete hardware elements. For example, in at least one embodiment, two or more of the blocks in a diagram are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for operating a wireless device, comprising:
   receiving a wireless signal from a wireless body appliance being worn by a user that indicates that said user has been authenticated;
   determining, after receiving said wireless signal, whether said user is within a predetermined distance of the wireless device;
   when determining determines that said user is within said predetermined distance of said wireless device, and said user is not logged in to said wireless device, automatically logging said user in to said wireless device; and
   when determining determines that said user is not within said predetermined distance of said wireless device, and said user is logged in to said wireless device, automatically locking said wireless device while keeping said user logged in, wherein a locked wireless device cannot be used by anyone and an unlocked wireless device can be used by a party that is logged in; and
   sending a wireless notification signal to said wireless body appliance when a predetermined event occurs, said wireless notification signal identifying a type of notification structure to be used to notify said user of said predetermined event, wherein said wireless body appliance notifies said user in response to said wireless notification signal.

2. The method of claim 1, wherein:
   said wireless body appliance authenticates said user using biometric authentication.

3. The method of claim 1, wherein:
   said predetermined distance is less than a wireless range of said wireless body appliance.

4. The method of claim 1, wherein:
   determining whether said user is within a predetermined distance of the wireless device includes determining whether a power level being received from said wireless body appliance is above a threshold level.

5. The method of claim 1, further comprising:
   when determining determines that said user is within said predetermined distance of said wireless device, said user is logged in to said wireless device, and said wireless device is locked, automatically unlocking said wireless device.

6. The method of claim 5, further comprising:
   repeating determining, automatically logging, automatically locking, and automatically unlocking at periodic intervals.

7. A wireless body appliance comprising:
   at least one biometric sensor to measure biometric information from a user wearing said wireless body appliance;
   a biometric authentication unit to determine whether said user is an authorized user associated with said body appliance, based on said biometric information;
   a wireless transmitter to transmit a signal indicating that said user has been authenticated when said biometric authentication unit determines that said user is an authorized user;
   at least one notification structure for use in notifying said user of the occurrence of an event; and
   a wireless receiver to receive a wireless notification signal from a wireless device that identifies an event that has occurred, wherein said at least one notification structure includes multiple different notification structures and said wireless notification signal identifies which type of notification structure is to be used to notify said user of said event.

8. The wireless body appliance of claim 7, wherein: said body appliance includes one of the following: a glove and a hat.

9. The wireless body appliance of claim 7, wherein:
   said body appliance includes one of the following: a ring, a locket, a brooch.

10. The wireless body appliance of claim 7, wherein:
    said at least one biometric sensor includes N biometric sensors, where N is an integer greater than 1; and
    said biometric authentication unit requires a biometric data match for M of said N biometric sensors to determine that a party wearing said wireless body appliance is an authorized user, where M is an integer greater than 1 but less than N.

11. The wireless body appliance of claim 7, wherein:
    said wireless transmitter is configured in accordance with a Bluetooth protocol.

12. The wireless body appliance of claim 7, wherein:
    said at least one notification structure includes at least one of a heating element and a cooling element.

13. A wireless device comprising:
    a user interface;
    a controller to control operation of said wireless device, said controller being in communication with said user interface to accept input from a user and to deliver output to said user; and
    a wireless transceiver to support wireless communication with at least one other wireless entity;
    wherein said controller is programmed to: receive an indication that a user has been authenticated by a wireless body appliance being worn by said user, determine, after receiving said indication, whether said authenticated user is within a predetermined distance of said wireless device, automatically log in said authenticated user to said wireless device when said authenticated user is determined to be within a predetermined distance of said wireless device and said user is not already logged in, and automatically lock said wireless device while keeping said user logged in when said authenticated user is determined to not be within said predetermined distance of said wireless device and said user is logged in to said wireless device, wherein a locked wireless device cannot be used by anyone and an unlocked wireless device can be used by a party that is logged in;
    wherein said controller is programmed to send a wireless notification signal to said wireless body appliance when a predetermined event occurs, said wireless notification signal identifying a type of notification structure to be used to notify said user of said predetermined event, wherein said wireless body appliance notifies said user in response to said wireless notification signal.

14. The wireless device of claim 13, wherein:
said user interface includes at least one of the following: a display, a keypad, a keyboard, a touch screen, a stylus, a mouse, scroll buttons, a track ball, a joystick, and control buttons.

15. The wireless device of claim 13, wherein:
said controller determines whether said user is within a predetermined distance of said wireless device by determining whether a power level being received from said wireless body appliance is above a threshold level.

16. The wireless device of claim 13, wherein:
said wireless transceiver is configured in accordance with a Bluetooth protocol.

17. The wireless device of claim 13, wherein:
said controller is programmed to automatically unlock said wireless device when said user is within said predetermined distance of said wireless device and said user is logged in to said wireless device and said wireless device is locked.

18. The wireless device of claim 17, wherein:
said controller is programmed to repeat the following at periodic intervals: determine whether said authenticated user is within said predetermined distance of said wireless device, automatically log in said authenticated user to said wireless device when said authenticated user is determined to be within said predetermined distance of said wireless device and said user is not already logged in, automatically lock said wireless device while keeping said user logged in when said authenticated user is determined to not be within said predetermined distance of said wireless device and said user is logged in to said wireless device, and automatically unlock said wireless device when said user is within said predetermined distance of said wireless device and said user is logged in to said wireless device and said wireless device is locked.

19. An article comprising a computer readable storage medium having instructions stored thereon that, when executed by a computing device, operate to:
receive a wireless signal from a wireless body appliance being worn by a user that indicates that said user has been authenticated;
determine, after receipt of said wireless signal, whether said user is within a predetermined distance of a wireless device;
when said user is determined to be within said predetermined distance of said wireless device and said user is not logged in to said wireless device, automatically log said user in to said wireless device;
when said user is determined not to be within said predetermined distance of said wireless device and said user is logged in to said wireless device, automatically lock said wireless device while keeping said user logged in, wherein a locked wireless device cannot be used by anyone and an unlocked wireless device can be used by a party that is logged in; and
send a wireless notification signal to said wireless body appliance when a predetermined event occurs, said wireless notification signal identifying a type of notification structure to be used to notify said user of said predetermined event, wherein said wireless body appliance notifies said user in response to said wireless notification signal.

20. The article of claim 19, wherein said computer readable storage medium further includes instructions that, when executed by the computing device, operate to:
when said user is within said predetermined distance of said wireless device and said user is logged in to said wireless device and said wireless device is locked, automatically unlock said wireless device.

21. The article of claim 20, wherein said computer readable storage medium further includes instructions that, when executed by the computing device, operate to:
repeat the following at periodic intervals: determine whether said user is within a predetermined distance of said wireless device; when said user is within said predetermined distance of said wireless device and said user is not logged in to said wireless device, automatically log said user in to said wireless device; when said user is not within said predetermined distance of said wireless device and said user is logged in to said wireless device, automatically lock said wireless device while keeping said user logged in; and when said user is within said predetermined distance of said wireless device and said user is logged in to said wireless device and said wireless device is locked, automatically unlock said wireless device.

22. A wireless device comprising:
at least one dipole antenna;
a user interface;
a controller to control operation of said wireless device, said controller being in communication with said user interface to accept input from a user and to deliver output to said user; and
a wireless transceiver, coupled to said at least one dipole antenna, to support wireless communication with at least one other wireless entity;
wherein said controller is programmed to: receive an indication that a user has been authenticated by a wireless body appliance being worn by said user, determine, after receiving said indication, whether said authenticated user is within a predetermined distance of said wireless device, automatically log in said authenticated user to said wireless device when said authenticated user is determined to be within a predetermined distance of said wireless device and said user is not already logged in, and automatically lock said wireless device while keeping said user logged in when said authenticated user is determined to not be within said predetermined distance of said wireless device and said user is logged in to said wireless device, wherein a locked wireless device cannot be used by anyone and an unlocked wireless device can be used by a party that is logged in;
wherein said controller is programmed to send a wireless notification signal to said wireless body appliance when a predetermined event occurs, said wireless notification signal identifying a type of notification structure to be used to notify said user of said predetermined event, wherein said wireless body appliance notifies said user in response to said wireless notification signal.

23. The wireless device of claim 22, wherein:
said wireless transceiver is configured in accordance with a Bluetooth protocol.

24. The wireless device of claim 22, wherein:
said controller is programmed to automatically unlock said wireless device when said user is within said predetermined distance of said wireless device and said user is logged in to said wireless device and said wireless device is locked.

25. The wireless device of claim 22, wherein:
said controller is programmed to repeat the following at periodic intervals: determine whether said authenticated user is within said predetermined distance of said wireless device, automatically log in said authenticated user to said wireless device when said authenticated user is determined to be within said predetermined distance of said wireless device and said user is not already logged in, automatically lock said wireless device while keeping said user logged in when said authenticated user is determined to not be within said predetermined distance of said wireless device and said user is logged in to said wireless device, and automatically unlock said wireless device when said user is within said predetermined distance of said wireless device and said user is logged in to said wireless device and said wireless device is locked.

* * * * *